ized Patent [19]

United States Patent [19]
Luther et al.

[11] Patent Number: 4,502,660
[45] Date of Patent: Mar. 5, 1985

[54] MOLD INCLUDING SIDE WALLS WITH LOCKING PROJECTIONS

[76] Inventors: LeRoy D. Luther, 4645 N. 147th St., Brookfield, Wis. 53005; Robert E. Brock, S69 W32751 Westgate Dr., Mukwonago, Wis. 53149

[21] Appl. No.: 553,501

[22] Filed: Nov. 21, 1983

[51] Int. Cl.³ .......................... B29C 1/06; B29C 1/16; B29F 1/00
[52] U.S. Cl. ..................... 249/144; 249/63; 249/152; 249/162; 249/180; 249/184; 425/441; 425/577; 425/DIG. 5; 425/DIG. 58
[58] Field of Search .............. 425/DIG. 5, DIG. 58, 425/438, 441, 451.7, 577, 468, 451.9, DIG. 221; 249/161, 162, 165, 63, 152, 178, 180, 184, 160; 264/318

[56] References Cited
U.S. PATENT DOCUMENTS

| | | | |
|---|---|---|---|
| 2,292,593 | 8/1942 | Amigo | 425/577 |
| 3,373,460 | 3/1968 | Ladney | 425/DIG. 5 |
| 3,473,197 | 10/1969 | Wilds et al. | 425/438 |
| 3,543,443 | 10/1970 | Tucker | 425/577 |
| 3,838,960 | 10/1974 | Lovejoy | 425/441 |
| 3,865,529 | 2/1975 | Guzzo | 425/438 |
| 3,905,740 | 9/1975 | Lovejoy | 425/438 |
| 3,930,780 | 1/1976 | Lovejoy | 425/441 |
| 3,977,821 | 8/1976 | Lovejoy | 425/468 |
| 4,206,799 | 6/1980 | McDonald | 425/451.9 |
| 4,362,291 | 12/1982 | Fuke et al. | 425/DIG. 58 |

Primary Examiner—J. Howard Flint, Jr.

[57] ABSTRACT

A mold defining a mold cavity for manufacture of an article, the mold comprising a plurality of mold side wall members, each of the side wall members including opposite end portions and including an inwardly facing surface comprising a mold surface for forming at least a portion of a side wall of the molded article. The side wall members are moveable from a closed position wherein the side wall members cooperate with said first and second end wall members to define a mold cavity conforming to at least a portion of the desired exterior dimensions of the article, and an open position in which each of the side wall members is displaced laterally outwardly of its closed position and away from the end wall members to a location in spaced relation from the end wall members. First end portions of the side wall members include projections adapted to be housed in cavities in the first end wall member when the first end wall member and the side wall members are in the closed position and to prevent outward movement of the side wall members. Opposite end portions of the side wall members also each include projections adapted to be housed in cavitites in the second end wall member.

6 Claims, 5 Drawing Figures

MOLD INCLUDING SIDE WALLS WITH LOCKING PROJECTIONS

FIELD OF THE INVENTION

The invention relates to apparatus for molding and more particularly to an improved mold construction with side wall members including integral means for supporting the side wall members against outward deflection.

BACKGROUND PRIOR ART

Prior art mold assemblies such as shown in the Wilds et al. U.S. Pat. No. 3,473,197 typically include a relatively large yoke surrounding moveable side wall members or portions of the mold apparatus, this large yoke being included to provide support for the side wall members and to prevent outward deflection of the side wall members during injection of plastic material into the mold.

The provision of the large yoke surrounding the side wall members as shown in the Wilds et al. patent adds to the weight of the mold and increases the complexity of the mold apparatus. The provision of the large yoke also requires the construction of a large mold and the use of a large mold press or machine and therefore requires a large capital expenditure.

The Lovejoy U.S. Pat. No. 3,838,960 illustrates an effort to design a mold construction which eliminates the use of the large yoke surrounding the mold side walls. In the Lovejoy construction, the large yoke is replaced by a plurality of retaining blocks, these retaining blocks being mounted or set in cavities provided in the mold members, the retaining blocks being positioned so as to engage the outer surfaces of the side wall members when the mold is in the closed position.

SUMMARY OF THE INVENTION

The present invention provides an improved mold structure with a simplified construction that avoids the necessity of a large yoke typically used in the prior art molds to support the moveable side wall members of the mold structure. The construction embodying the invention also eliminates the use of a plurality of retaining blocks mounted in the opposed mold members.

More particularly, the invention includes a mold defining a mold cavity for manufacture of an article, the mold including a first end wall member including a mold surface and a plurality of cavities formed in the end wall and spaced outwardly from the mold surface, and a second end wall member including a surface facing the first end wall and including a plurality of spaced apart cavities. At least one of the first and second end wall members is adapted to be supported for movement toward and away from the other of the end wall members between a molding position and an open position. The mold also includes a plurality of mold side wall members, each of these side wall members including opposite end portions and an inwardly facing surface defining a mold surface for forming at least a portion of a side wall of the plastic molded article. The side wall members are moveable from a closed position wherein first end portions of each of the side wall members engage the first end wall member and opposite end portions of the side wall members engage the second end wall member and wherein the side wall members cooperate with the first and second end wall members to define a mold cavity conforming to at least a portion of the desired exterior dimensions of the plastic article. The side wall members are also movable to an open position in which each of the side wall members is displaced laterally outwardly of its closed position and away from the end wall members to a location in spaced relation from the end wall members. The first end portions of the side wall members include projections adapted to be housed in the cavities in the first end wall member when the first end wall member and the side wall members are in the closed position and to prevent outward movement of the side wall members. The opposite end portions of the side wall members each include projections adapted to be housed in the cavities in the second end wall member when the second end wall member and the side wall members are in the closed position and to prevent outward movement of the side wall members.

Various other features and advantages of the invention will be apparent by reference to the following description of a preferred embodiment, from the drawings, and from the claims.

Figure 1:
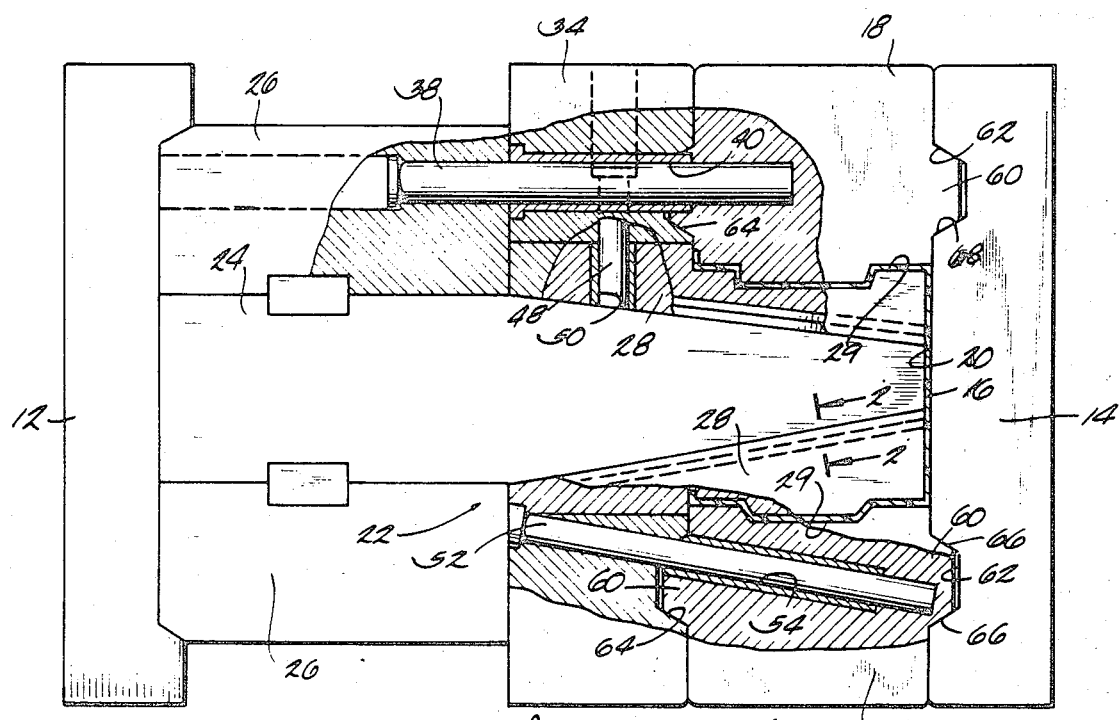
FIG. 1 is an elevation view of an injection mold apparatus embodying the invention.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

While in the illustrated construction the mold apparatus is described as employed in an injection molding machine, it will be understood by those skilled in the art that the apparatus embodying the invention could be used in other molding or die casting applications. Illustrated in FIG. 1 is an injection mold 10 embodying the present invention and including a first mold plate 12 and a second mold plate 14 adapted to be fixed to respective mold platens of a conventional hydraulic, pneumatic or mechanical mold press. As is well understood in the art, the press is operative for moving the mold plates 12 and 14 between a closed position illustrated in FIG. 1 and an open position shown in FIG. 5 wherein the molded product 16 can be ejected from the mold 10 and removed from the molding machine.

Figure 2:
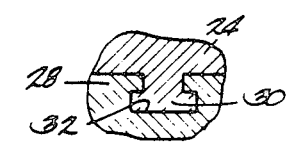
FIG. 2 is an enlarged cross-section view taken along line 2—2 in FIG. 1.

In the specific embodiment of the invention illustrated in the drawings, the injection mold 10 also includes four side wall members 18. While only two mold side wall members 18 are illustrated, it should be understood the side wall members not shown have the same construction as those shown in the drawings. The side wall members 18 and a transverse end wall 20 defined by an adjacent face of the mold plate 14 cooperate to define a rectangular mold cavity conforming to the desired exterior dimensions of the product 16 to be molded in the mold 10. The illustrated injection mold 10 also includes a core assembly 22. The core assembly 22 includes a central projecting core member 24 having a rearward end fixed to the mold plate 12. The sides of the projecting core member 24 are supported by support blocks 26 fixed to the mold plate 12 and fixed to opposite sides of the rearward end of the central core member 24. The projecting or free end of the central core member 24 is rectangular in cross section and tapers toward the free end such that it is substantially smaller in cross section at the free end than it is at the end fixed to the mold plate 12. In the illustrated construction, the core assembly 22 also includes a pair of slideable core members 28 slideably supported by the projecting or free end of the central core member 24. The slideable core members 28 include external surfaces 29 adapted to define the interior configuration of the molded product when the mold 10 is closed. While the slideable core members 28 could be joined to the core 24 in other ways, in the illustrated arrangement the slideable core members 28 are each slideably joined to the central core member 24 by a T-slot slide arrangement best illustrated in FIG. 2, and comprised of a T-shaped slide member 30 projecting from the central core member 24 and housed in a complementary slot 32 provided in the core member 28. This T-slot arrangement permits limited slideable movement of the slideable core members 28 with respect to the central core member 24 generally in the direction of the longitudinal axis of the central core member.

Figure 4:
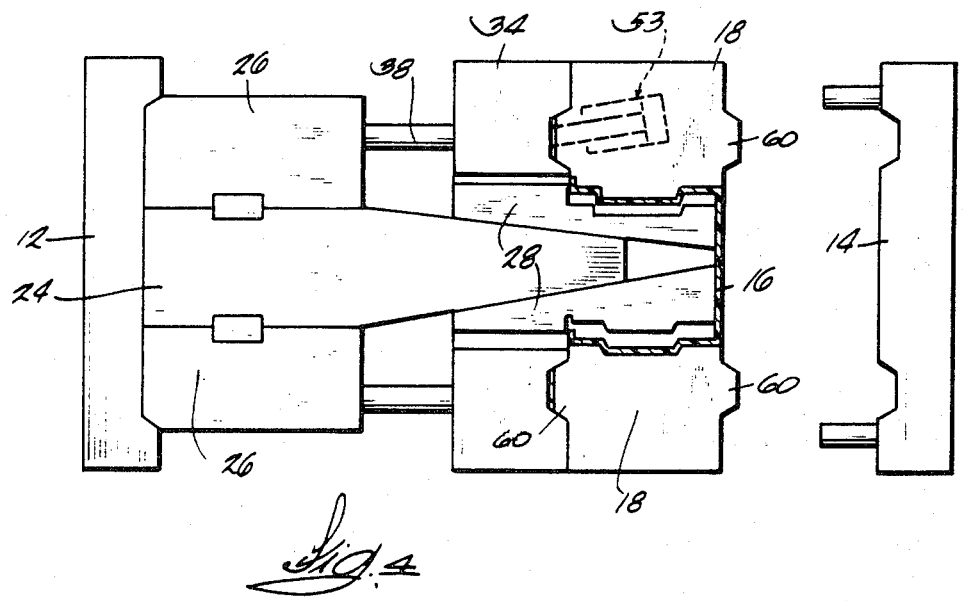
FIG. 4 is a view similar to FIG. 3 and showing the mold apparatus in a second mold opening step.
Figure 5:
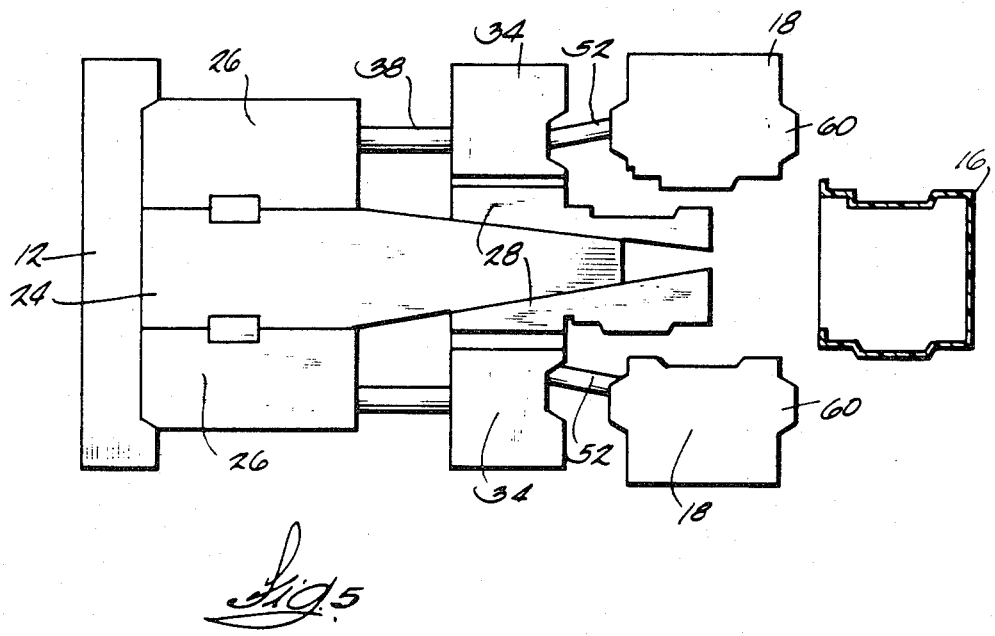
FIG. 5 is a view similar to FIGS. 3 and 4 and showing the mold apparatus in a third mold opening step wherein the molded part can be removed from the mold.

The illustrated injection mold 10 further includes a retainer block or retainer ring 34 surrounding the core assembly 22 and adapted to engage the slideable core members 28 and to be positioned against the core support blocks 26 when the mold 10 is closed and also adapted to be moveable away from the core support members 26 when the mold is opened as shown in FIGS. 4 and 5.

Means are also provided for supporting the retainer ring 34 for movement toward and away from the core support blocks 26 and the mold plate 12 when the mold 10 is opened and closed. While various means could be provided for supporting the retainer ring 34, in the illustrated construction this means is comprised of pins 38 supported by the support blocks 26 and housed in complementary bushings 40 provided in the retainer ring 34. The retainer ring 34 is freely slideably moveable on the pins 38 toward and away from the mold plate 12 and the support blocks 26. While only one pin 38 is shown in the drawings it is illustrative of a plurality of pins 38 supporting the retaining block. It will also be understood by those skilled in the art that while the pins 38 could have other conventional constructions and can be supported in various ways, in the illustrated arrangement the pins 38 are rigidly secured to the support blocks 26 and extend through the support blocks 26 and into the bushings 40 in the retainer ring.

Figure 3:
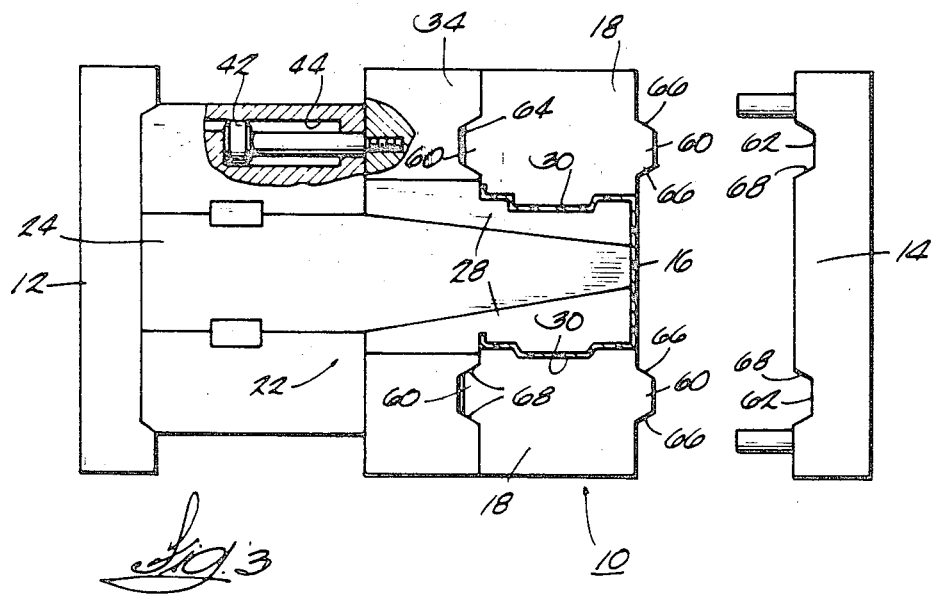
FIG. 3 is a reduced view of the apparatus illustrated in FIG. 1 and showing a first step in opening of the mold apparatus.

Means are also provided for selectively causing movement of the retainer ring 34 away from the support blocks when the mold 10 is opened. While various conventional means could be provided for causing such movement of the retainer ring 34, in the illustrated arrangement this means includes at least one hydraulic piston 42 and cylinder 44 (FIG. 3) adapted to be connected to the hydraulic control mechanisms of the mold press. In other constructions hydraulic apparatus independent of the mold and press could also be provided for causing movement of the retainer ring.

Means are also provided for joining the moveable core members 28 to the retainer ring 34 such that when the mold 10 is opened and the retainer ring 34 is caused to move away from the support blocks 26 and along the length of the central core member 24 toward the free end of the central core member, the moveable core members 28 are caused to move with the retainer ring 34 toward the free end of the central core member. Since the free end of the central core member 24 is tapered and smaller than the end of the core member 24 fixed to the mold plate 12, as the moveable core members 28 move along the length of the central core member 24, they are caused to move toward each other whereby the core assembly 22 is caused to collapse with respect to the inner surface of the molded product 16. While various means could be provided for joining the moveable core members 28 to the retainer ring 34, in the illustrated arrangement the means for supporting the slideable core members 28 for movement with the retainer ring includes a plurality of pins 48 fixed to the retaining ring 34 and extending inwardly from the retaining ring and being slideably housed in complementary bushings 50 provided in the core members.

Means are also provided for supporting the mold side wall members 18 for movement in a defined specific path from a closed position to an open position wherein each of the side wall members are displaced from the mold plate 14 and from the retainer ring 34 and are positioned laterally outwardly from the molded container 16. While various means could be provided for supporting the mold side wall members, in the illustrated arrangement, the means for supporting includes pairs of guideposts 52 which ride in complementary bushings 54 in each side wall member 18. The guidepost and bore arrangement illustrated in FIG. 1 is exemplary of the corresponding structure of the remaining side wall members 18. In the illustrated arrangement the guidepost 52 comprises a pin including a head and extends through the retainer block 34 and into the bushing 54 in the side wall member 18. The post 52 is rigidly secured to the retainer block 34.

Means are also provided for selectively causing movement of the mold side wall members 18 away from the retainer ring 34 and outwardly away from the molded product. While it will be understood by those skilled in the art that various conventional means could be provided for moving the side wall members 18, in the illustrated arrangement, piston and cylinder assemblies 53 (FIG. 4) adapted to be connected to the hydraulic control mechanisms of the mold press are provided.

Means are further provided for supporting the side wall members 18 against outward movement away from the mold cavity and core when the mold 10 is closed. This means precludes outward movement of the side wall members 18 in response to injection pressure of fluid plastic during the injection molding operation. The means for supporting the side wall members 18 includes pairs of interlock cams or projections 60 projecting from the opposite ends of each of the side wall members 18. The interlock cams 60 projecting from one end of the side wall members 18 are adapted to be housed in complementary cavities or pockets 62 provided in the mold plate 14. The interlock cams 60 projecting from the opposite end of the mold side walls 18 are adapted to be housed in complementary cavities or pockets 64 provided in the face of the retainer ring 34.

While the projecting interlock cams 60 could have other constructions, in the illustrated arrangement, each of the projecting interlock cams 60 include side walls 66 which are tapered so as to converge toward the free end of the cam. The cavities or pockets 62 and 64 similarly include side walls 68 with a complementary taper such that as the mold 10 is closed, the interlock cams 60 will be securely housed in the cavities or pockets 62 and 64.

In operation, when plastic is injected into the mold cavity thereby generating an outward force on each of the mold side walls 18, the outer surfaces 66 of the cams will engage the surfaces 68 of the cavities or pockets 62 and 64 and thereby restrain the side walls 18 against outward movement.

By construction of the side wall members 18 as described above and including the projecting cams 60, it is possible to delete the large side wall retaining rings provided in the prior art constructions. This can result in a substantial savings in both the weight of the mold assembly as well as in the manufacturing cost of the mold. The use of the projecting cams and the elimination of the side wall retaining ring also permits the use of a smaller press and accordingly a substantial savings in capital equipment. Additionally, mold strength is not sacrificed since the projecting cams are integral components of the side wall members, and the pockets or cavities 62 and 64 receiving the projecting cams 60 are formed directly in the faces of the platen and the mold retaining ring.

Various features of the invention are set forth in the following claims.

We claim:

1. A mold defining a mold cavity for manufacture of an article having a plurality of side walls, the mold comprising
    a first end wall member including a surface, a first portion of said surface defining a mold surface and a plurality of cavities formed in said surface, said cavities being spaced outwardly from said mold surface, each of said first end wall member cavities including an inner cam surface adjacent said mold surface and an outer cam surface spaced outwardly from said inner cam surface,
    a second end wall member including a surface facing said first end wall, said second end wall member surface including a plurality of spaced apart cavities, each of said cavities of said second end wall member including an inner cam surface and an outer cam surface,
    at least one of said first and second end wall members being adapted to be supported for movement toward and away from the other of said first and second end wall members between a molding position and an open position,
    a plurality of mold side wall members, each of said side wall members including opposite end portions, one of said end portions facing said first end wall member and the other of said end portions facing said second end wall member, and said side wall members each including an inwardly facing surface comprising a mold surface for forming at least a portion of a side wall of the molded article, said side wall members being moveable from a closed position wherein said one of said end portions of each of said side wall members engage said surface of said first end wall member and wherein said other of said end portions of said side wall members engage said second end wall member and wherein said side wall members cooperate with said first and second end wall members to define a mold cavity conforming to at least a portion of the desired exterior dimensions of the articles, and an open position in which each of said side wall members is displaced laterally outwardly of its closed position and away from said end wall members to a location in spaced relation from said end wall members, and
    means for preventing inward and outward movement of said mold side wall members with respect to said mold cavity when said mold side wall members are in said closed position, said means for preventing inward and outward movement including projections extending from said one of said end portions of each of said side wall members, said projections being housed in said first end wall member cavities when said first end wall member and said side wall members are in said closed position and to prevent outward movement of said side wall members, said projections including outer cam surfaces engaging said outer cam surfaces of said first end wall member cavities and inner cam surfaces engaging said inner cam surface of said first end wall member cavities, and said other of said end portions of said side wall members each including projections adapted to be housed in said second end wall member cavities when said second end wall member and said side wall members are in said closed position and to prevent outward movement of said side wall members, said projections of said other of said end portions including outer cam surfaces engaging said outer cam surfaces of said second end wall member cavities and inner cam surfaces engaging said inner cam surfaces of said first end wall member cavities.

2. A mold as set forth in claim 1 and further including a core having a central core element, said central core element including an inclined surface and at least one movable core element supported for slideable movement along said inclined surface of said central core element, and said movable core member being supported for movement with said second end wall toward and away from said first end wall.

3. A mold as set forth in claim 2 wherein said central core element is fixed in place and has a longitudinal axis and wherein said first end wall is movable toward and away from said central core element and wherein said second end wall surrounds said central core element and moves with respect to said central core element in the direction of said longitudinal axis.

4. A mold defining a mold cavity for manufacture of an article having a plurality of side walls, the mold comprising
    a first end wall member including a surface, a first portion of said surface defining a mold surface and a plurality of cavities formed in said surface, said cavities being spaced outwardly from said mold surface,
    a second end wall member including a surface facing said first end wall, said second end wall member surface including a plurality of spaced apart cavities, at least one of said first and second end wall members being adapted to be supported for movement toward and away from the other of said first and second end wall members between a molding position and an open position, a plurality of mold side wall members, each of said side wall members including opposite end portions and including an inwardly facing surface comprising a mold surface for forming at least a portion of a side wall of the molded article, said side wall members being moveable from a closed position wherein first end portions of each of said side wall members engage said surface of said first end wall member and wherein opposite end portions of said side wall members engage said second end wall member and wherein said side wall members cooperate with said first and second end wall members to define a mold cavity conforming to at least a portion of the desired exterior dimensions of the articles, and an open position in which each of said side wall members is displaced laterally outwardly of its closed position and away from said end wall members to a location in spaced relation from said end wall members, said first end portions of said side wall members including projections adapted to be housed in said first end wall member cavities when said first end wall member and said side wall members are in said closed position and to prevent inward and outward movement of said side wall members, and said opposite end portions of said side wall members each including projections adapted to be housed in said second end wall member cavities when said second end wall member and said side wall members are in said closed position and to prevent inward and outward movement of said side wall members, and a core having a central core element, said central core element including an inclined surface and at least one movable core element supported for slideable movement along said inclined surface of said central core element, and said movable core member being supported for movement with said second mold end wall member toward and away from said first end wall.

5. A mold as set forth in claim 4 wherein said central core element is fixed in place and has a longitudinal axis, and wherein said first end wall member is movable toward and away from said central core and wherein said second end wall surrounds said central core and moves with respect to said central core in the direction of said longitudinal axis.

6. A mold defining a mold cavity for manufacture of an article having a plurality of side walls, the mold comprising a first end wall member including a surface, a first portion of said surface defining a mold surface and a plurality of cavities formed in said end wall surface, and said cavities each including sloped cavity side walls, and a bottom wall, said cavity side walls converging toward said cavity bottom wall, a second end wall member including a surface facing said first end wall, said second end wall member surface including a plurality of cavities, said second end wall member cavities being spaced apart and each including sloped cavity side walls and a bottom wall, said cavity side walls converging toward said cavity bottom wall, at least one of said first and second end wall members being adapted to be supported for movement toward and away from the other of said first and second end wall members between a molding position and an open position, a plurality of mold side wall members, each of said side wall members including opposite end portions and including an inwardly facing surface comprising a mold surface for forming at least a portion of a side wall of the molded article, said side wall members being movable from a closed position wherein first end portions of each of said side wall members engage said surface of said first end wall member and opposite end portions of said side wall members engage said second end wall member and wherein said side wall members cooperate with said first and second end wall members to define a mold cavity conforming to at least a portion of the desired exterior dimensions of the article, and an open position in which each of said side wall members is displaced laterally outwardly of its closed position and away from said end wall members to a location in spaced relation from said end wall members, said first end portions of said side wall members including projections adapted to be housed in said first end wall member cavities when said first end wall member and said side wall members are in said closed position and to prevent inward and outward movement of said side wall members, said projections each including a first cam surface adapted to engage one of said sloped cavity side walls of said first end wall member cavities and a second cam surface adapted to engage another of said sloped cavity side walls of said first end wall member cavities, and said opposite end portions of said side wall members each including projections adapted to be housed in said second end wall member cavities when said second end wall member and said side wall members are in said closed position and to prevent inward and outward movement of said side wall members, said opposite end portion projections including a first cam surface adapted to engage one of said sloped cavity side walls of said second end wall member and a second cam surface adapted to engage another of said sloped cavity side walls of said second end wall member.

* * * * *